Nov. 14, 1967    R. C. SWATEK ET AL    3,352,332
PROBE WITH SLIDING SEALED NOZZLE
Filed Dec. 18, 1964    3 Sheets-Sheet 3

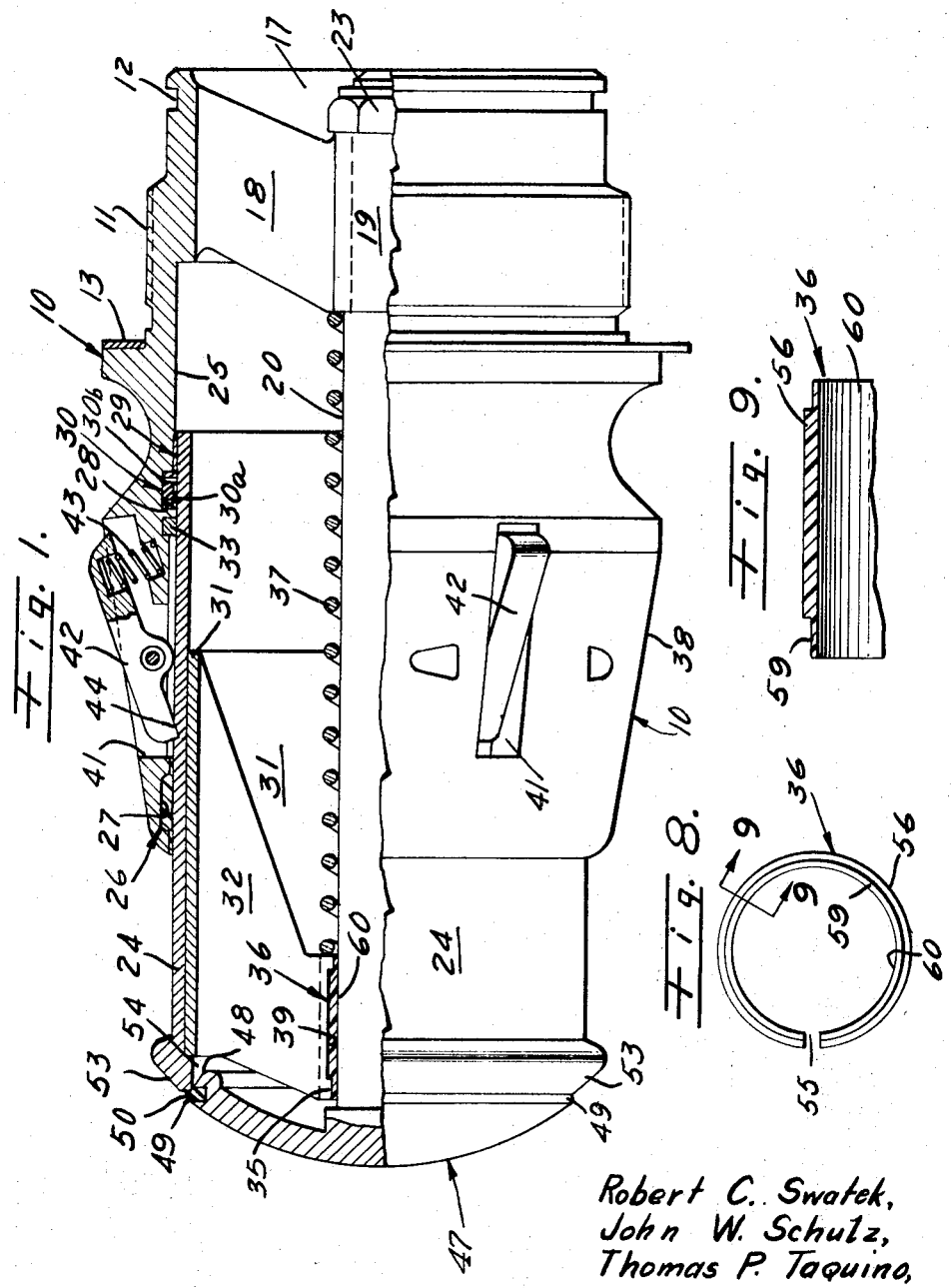

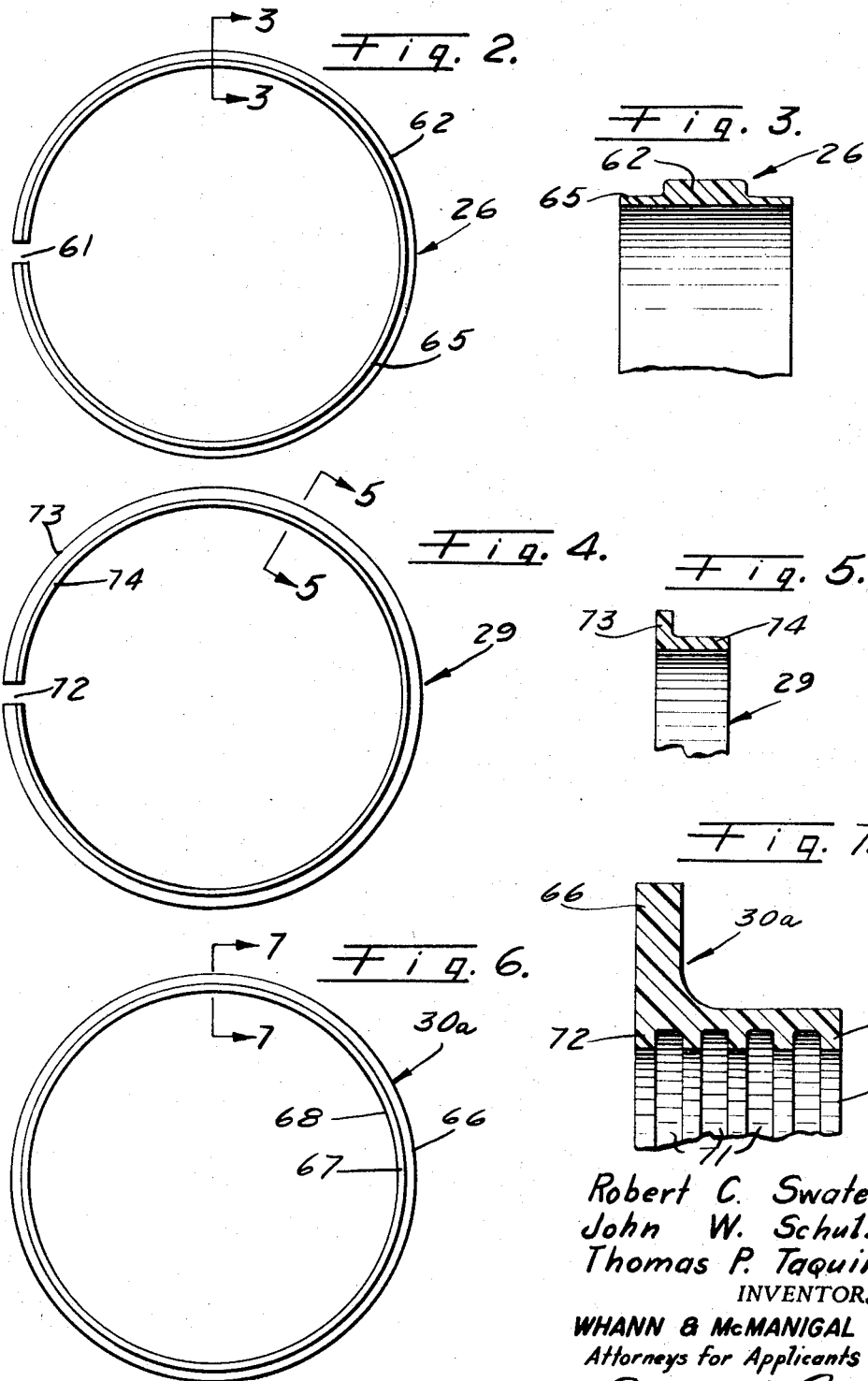

ROBERT C. SWATEK
JOHN W. SCHULZ
THOMAS P. TAQUINO
INVENTORS.
WHANN & McMANIGAL
Attorneys for Applicants
BY

United States Patent Office 3,352,332
Patented Nov. 14, 1967

3,352,332
PROBE WITH SLIDING SEALED NOZZLE
Robert C. Swatek, Glendora, John W. Schulz, Pasadena, and Thomas P. Taquino, Sierra Madre, Calif., assignors to Schulz Tool and Manufacturing Co., San Gabriel, Calif., a corporation of California
Filed Dec. 18, 1964, Ser. No. 419,445
7 Claims. (Cl. 141—349)

This invention relates to a probe to be used in cooperation with a drogue for in-flight refueling of aircraft at extremes of temperatures, and more particularly, to bearing means and sealing means for the probe.

This invention forms a part of a system wherein a tubular connection is lowered from a tanker plane, and with which connections are made with a forwardly extending tubular conduit member extending from a plane to be refueled.

The conduit extending from the tanker plane carries at its end a fitting called a drogue, and with which fluid-type connections are made by a fitting called a probe, at the end of the conduit member extending forwardly from the plane to be refueled. The connection between the drogue and probe is made in mid-air and is a universal connection to accommodate relative movements of the plane in flight.

It is an object of the invention to provide an improved probe for use in in-flight refueling systems in a temperature range of from —65° F. to 350° F.

It is another object of the invention to provide improved bearings and seals for slidable telescoped members for use at temperature extremes and which prevent scoring and sticking of the members.

It is still another object of the invention to provide new bearing and seal configurations for use between two slidable telescoped members wherein the latter have a hard anodized aluminum finish.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes:

FIG. 1 is a side elevational view of a probe, partially in cross section, illustrating the use of the bearings and seal in accordance with the invention;

FIG. 2 is a side elevational view of an elastomeric, split-ring bearing as used between the probe housing and the probe sleeve;

FIG. 3 is a cross sectional view, taken as indicated by the line 3—3 in FIG. 2;

FIG. 4 is a side elevational view of another elastomeric split-ring bearing;

FIG. 5 is a fragmentary cross sectional view, taken as indicated along the line 5—5 in FIG. 4;

FIG. 6 is a side elevational view of an elastomeric sealing ring;

FIG. 7 is a fragmentary cross sectional view, taken as indicated along the line 7—7 in FIG. 6;

FIG. 8 is a side elevational view of an elastomeric split-ring bearing as used in the probe between the sleeve support means and the valve stem;

FIG. 9 is a cross sectional view, taken as indicated by the line 9—9 in FIG. 8.

Figure 10:
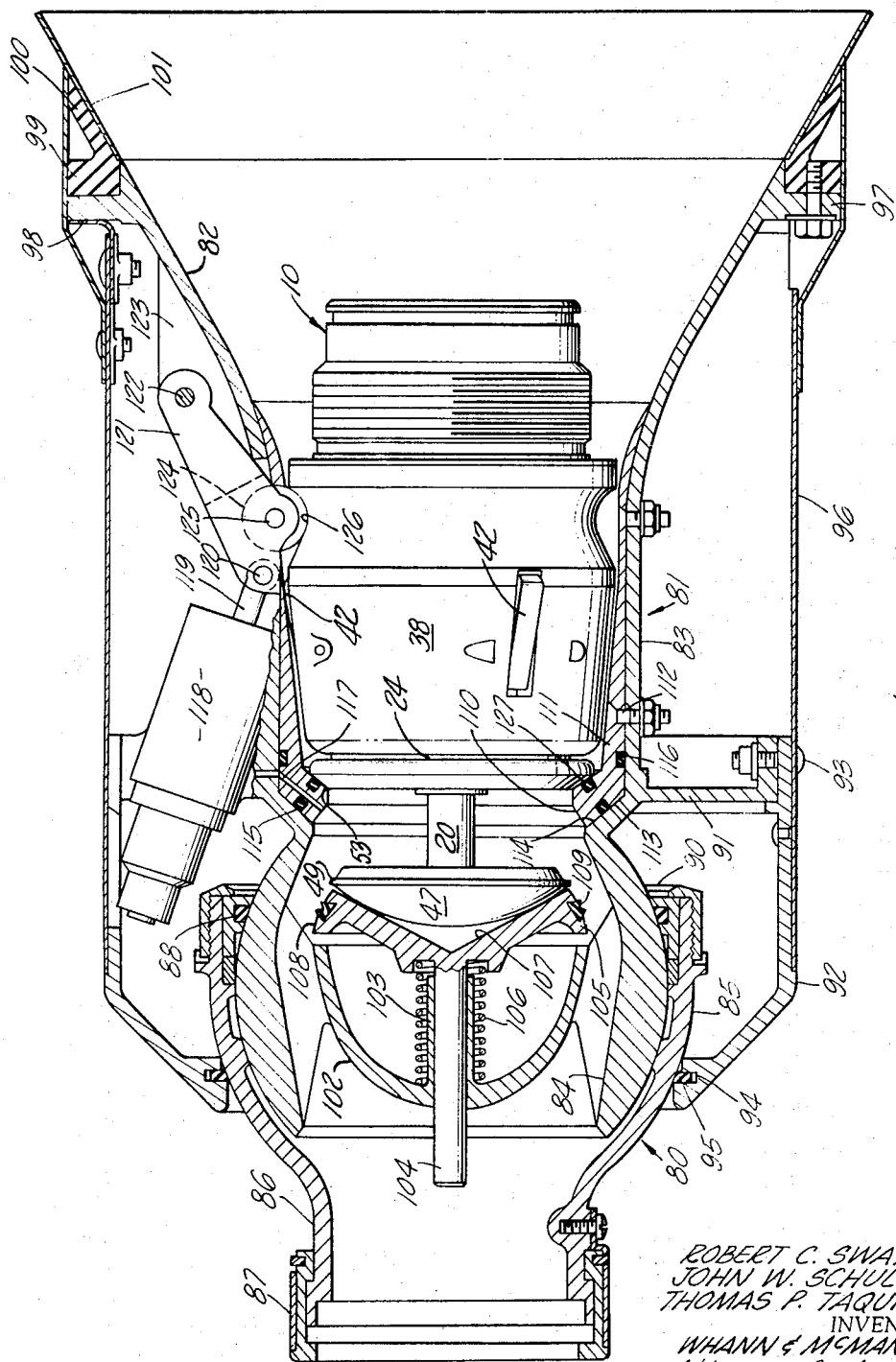
FIG. 10 is a view of the probe in operational connection within a drogue.

Referring again to the drawings, in FIG. 1 the probe is shown to comprise a generally cylindrical housing member 10 having a screw threaded portion 11, the threads not being shown in detail, with an annular groove 12 and a shoulder 13, adapting it for connection to a tubular member extending from the airplane to be refueled.

The housing 10 has a generally cylindrical opening therethrough and at the outlet 17 there are a plurality of radially directed webs 18, supporting a centrally positioned cylindrical member 19, through which extends a valve stem 20. The stem 20 is secured and adjusted in place by means of a nut 23 on the end thereof. Surrounding the stem and slidably and telescopically fitted into the housing is a sleeve 24, having a hard anodized aluminum exterior. The sleeve is mounted to slide within a hard anodized aluminum, inner cylindrical surface 25 of the housing, and is spaced radially therefrom by bearings 26 and 29, seal 30, and a felt wiper 33. The bearings and seal are fitted in annular grooves 27 and 28 in the inner housing surface. The seal is comprised of an O-ring 30b and an inner L-shaped ring 30a.

The sleeve has a hard anodized aluminum, annular member 31, press fit therein, in which extend radially directed webs 32 terminating inwardly in a cylindrical member 35. The member 35 has a generally cylindrical opening having a cylindrical bearing 36 in an annular groove 39 therein so as to support and guide the sleeve in axial movement on the valve stem 20. Spaced between the cylindrical members 35 and 19, and surrounding the stem 20, is a coiled biasing spring 37 against which the sleeve operates when it moves inwardly into the housing.

The housing 10 is flared outwardly at 38 and has a plurality of slotted portions, as shown at 41, and in each is a pivoted latch member 42, biased by a spring 43 as shown. The forward end of each latch engages an annular groove 44 in the sleeve 24 and prevents the retraction of the sleeve until the latch is released by coupling of the drogue and probe.

The stem 20 carries at its forward, outer end a combined valve and valve operator 47, it being a valve with regard to the sleeve 24 and a valve operator in regard to the drogue, generally designated as 80 in FIG. 10. The valve 47 has a conical face 48, carrying a sealing ring 49, adapted to engage the outer end 50 of the sleeve. The sealing ring 49 normally provides a seal between the valve and the end of the sleeve, so as to form a closed valve at the end of the probe.

The outer end of the sleeve 24 has a conical surface 53 which is adapted to contact a complementary surface within the drogue as the probe is inserted, the latter contact being made after the latches 42 make contact with the drogue to release the sleeve so that it moves inwardly within the housing 10 as the surface 53 is moved against the complementary drogue surface by the relative forward motion of the aircraft to be refueled. This causes the probe valve to be opened and permits the flow of fluid into the opening 54 at the outer end of the sleeve and through the sleeve and the housing into the airplane being refueled.

The valve 47 is adjusted to be in a normally sealed position on the sleeve by means of the adjusting nut 23 on the valve stem 20, the rotation of the nut being adapted to change the compression on the spring 37.

When the sleeve 24 is moved into the housing to open the valve, it slides on the bearings 26, 29, the wiper 33, and the sealing ring 30a, and the sleeve guide 35 slides on the bearing 36 in contact with the valve stem 20 of hard anodized aluminum. The bearing 36, as best seen in FIGS. 1, 8 and 9, is a split-ring having a thermal expansion gap 55 and is made of polytetrafluoroethylene. The ring 36 is T-shaped in cross section, having a T-leg 56 and a T-bar 59. The T-bar 59 has a continuous cylindrical surface 60 in the axial direction and terminates circumferentially at the gap 55.

The thickened central portion about 0.50", of the bearing 36, which is comprised of the T-leg and the portion of the T-bar in radial alignment therewith, is more than twice the cross sectional thicknesses about 0.20", of the axially directed portions of the T-bar which extend beyond the central portion. The circumferential surface 60 prevents metal-to-metal contact between the stem 20 and the cylindrical member 35. The bearing 36 is locked in place against axial movement by having the T-leg 56 positioned in the deeper portion of the annular groove 39.

To provide for thermal expansion at higher temperatures, there is a radial clearance between the end of the T-bar and the base surface of the groove 39. This clearance extends for the full circumference of the ring and in the radial direction is about 0.005". The gap 55 also provides for thermal expansion at high temperatures and for a ring between a diameter of about 0.600", the predetermined length of the gap is about 0.040". The gap tends to close at high temperatures and is provided to avoid buckling of the ring which would occur if it were closed.

The gap is also provided to prevent the ring, after it shrinks, at low temperatures, from gripping the stem. This is necessary because of the differential between the coefficient of expansion of hard anodized aluminum and polytetrafluoroethylene. The polytetrafluoroethylene has the advantage of having a good bearing strength when properly retained. It further has a low coefficient of friction and is soft enough to absorb contaminants which may come between the inner surace 60 and the outer surface of the stem 20. As the bearing material is softer than the hard anodized stem, when contaminants come between the two, they are pressed into the bearing surface without damaging the finish on the stem.

In FIGS. 2 and 3, there is shown a sleeve bearing 26 which is made of polytetrafluoroethylene and which has the same general characteristics as the bearing 36. By way of example, the bearing 26 has a diameter of approximately 3" and a predetermined thermal expansion gap 61 of about 0.060". The thickness of the central portion 62 has a thickness of about 0.74" and the thickness of the axial end portion 65 is about 0.022". This bearing is held in the annular groove 27 in the housing against axial movement, there being a clearance between the outer surface of the central portion 62 and the axial surface of the groove of about 0.005" to provide for thermal expansion. The bearing 26 functions in the same way during the temperature changes as does the bearing 36, previously described.

The seal 30 is comprised of a fluoro-silicone rubber or silicone rubber O-ring 30b and an L-shaped, continuous polytetrafluoroethylene ring 30a, positioned in the annular groove 28 in the housing. The ring 30a is shown in detail in FIGS. 6 and 7 and is comprised of a radially directed L-leg 66 and an axially directed L-base 67, relative to the sleeve 24. The L-leg is in abutment with the groove 28 so as to hold the seal in place. The inner surface 68 of the ring 30a has a plurality of axially spaced annular grooves 71, alternately between relatively thin lands 72.

By way of example, for a sleeve having an outer diameter of about 3.025", the iner diameter of the ring 30a may be about 2.970", the inner circumference being formed by the inner surfaces of the lands. The thickness of the L-base of the ring 30a may be about 0.030" and the length of the L-leg from the inner surface land to the outer circumference may be about 0.135". Thus, the inner diameter of the lands is less than that of the sleeve and the ring is stretched beyond its elastic limit to move it onto the sleeve. The lands are narrow, each of the same width, which, for example, may be between 0.018 and 0.015". The depth of the grooves between the lands may be between 0.010 and 0.015".

The use of fluoro-silicone or silicone rubber in the O-ring is necessary for use at high temperatures but at high temperatures it would grip the sliding sleeve tighter than necessary and this would tend to cause the sleeve to stick at the open position. In addition, silicone rubbers do not have good wear resistance. To overcome the foregoing problems, the ring 30a was conceived. The ring is, in effect, a slipper for the O-ring 30b, which, in its sealing action is compressed, as shown in FIG. 1, between the outer wall of the groove 28 and the base 67 of the ring 30a. The O-ring effects the seal by compressing the base 67, and more particularly, compresses the lands which are directly radially inwardly of the O-ring. The fact that the lands are narrow increases the unit loading on them without having an excessive compressive force in the O-ring. Thus, the force of the O-ring is sufficient to create a seal between the lands and the sleeve but not enough to cause or permit any binding between the lands and the sleeve.

The grooves 71 between the lands provide contaminant traps for any dirt or grit which may be on the surface of the sliding seal, and the lands serve as wipers. If grit gets past the first land, for example, the second land will stop it before it can get through and it will be deposited in the groove or grooves without damaging the seal.

The bearing 29, as shown in FIGS. 1, 4 and 5, is also a split-ring of polytetrafluoroethylene having a thermal expansion gap 72. The ring is L-shaped, having an L-leg 73 and an L-base 74. The L-leg 73 is fitted into the annular groove 28 and would serve as an abutment for the O-ring if it should be expanded axially substantially more than is shown in the drawing. The function of the ring 29 is to prevent scoring of the sleeve or internal surface 25 of the housing and which might occur when the valve end of the probe is hit at an angle as it approaches or is moved at any time to make an angular contact with the drogue.

A probe, as shown in FIG. 1, has been tested by cycling it more than 10,000 times without causing any scoring on the stem 20, the external surface of the sleeve 24, or on the internal surface 25 of the housing. That is, there has been no damage done to these surfaces and consequently there has been no tendency of the sleeve 24 to stick in the open position. The tests were identical in function to the engaging and disengaging of the probe and drogue as occurs during an in-flight refueling operation whereby when the probe enters the drogue, the latches 42 are released and the sleeve is contacted on the surface 53 to move it into the housing so as to open the valve. Upon disengagement the spring 37 forces the sleeve to make sealing contact on the seal 49 of the valve and permits the latches 42 to be re-engaged.

Referring to FIG. 10, the drogue 80 includes a member generally designated at 81 which includes a conical or bell-shaped portion 82, an intermediate cylindrical portion 83 and a generally spherical portion 84 at its left end. The spherical portion 84 forms a ball of a ball and socket joint, the socket member being designated as 85 and being generally hemispherical in shape. The socket member is cylindrical at its open end 86 and carries a ring-shaped coupling member 87 for connecting the socket member to an articulated conduit assembly extending downwardly from the tanker airplane which supplies the fuel for the plane being fueled.

The inner end of the socket is cylindrical and carries a seal 88 which engages the ball 84. The seal is held in position by a locking ring 90 engaging the cylindrical portion of the socket in a screw-threaded relationship. The connection between the socket and ball provides for universal movement of the part 81 of the drogue relative to the socket and the coupling member 87.

The portion 83 of the member 81 has outwardly extending webs as at 91 to which is attached a circular member 92 by bolts as shown at 93. The left end of the member 92 is tapered and it has an annular groove 94, carrying a ring-shaped scraper 95 engaging the exterior of the socket 85. A cylindrical shell 96 is attached to the member 92 and extends around the cone or bell-shaped portion 82 of the drogue. The portion 82 has an extending flange 97 to which the shell 96 is secured by brackets as shown at 98. A ring-shaped member 99 is secured to the flange 97 and has a flared extension 100, against the inner surface of which is a cone-shaped member 101, the inner surface of which is flush with the interior of the cone-shaped member 82.

Within the ball 84 there is formed a generally hemispherical web 102 which has a central longitudinal guide member 103 within which is received a stem 104 of a poppet valve 105. The poppet valve 105 operates against a coiled spring 106 surrounding the guide 103. The poppet valve is conical in shape having an inner conical face 107 and has a sealing face 108 which carries a sealing ring 109, adapted to seat against a seat 110 formed on the end of a cylindrical member 111 within the intermediate portion of the drogue. The cylindrical member 111 is attached by bolts 112 and has a slanting face at its left end as shown at 113 and which engages a slanted circular face 114 within portion 83, the latter face having an annular groove with a sealing ring 115 therein. The member 111 is also sealed by means of a sealing ring 116 in an annular groove in the side of the cylindrical member 111. In the end of the member 111 are three circumferentially spaced ports 117, opening into the face 110 and connecting the interior of the drogue with three circumferentially spaced hydraulic actuators 118, respectively. Extending outwardly of each actuator is a toggle link 119 which is moved reciprocally by the operation of the actuator. The toggle link is connected on a pivot 120, supported by a link 121 which in turn is supported on a pivot 122, secured on a bracket 123 radially outwardly on the cone 82. The roller 124 is supported on a pin 125 in the link 121. The links 119 and 121 form a knee which is adapted to be flexed to urge the roller 124 into a circumferential groove or channel 126 in the probe.

Through the port 117, fluid pressure is admitted to the hydraulic actuator when the valve operator 47 unseats the poppet 105 from the seat 110. Whenever the sealing rings 109 unseat, fuel pressure is admitted to the three hydraulic actuators to urge the toggle link 119 outwardly so as to flex the toggle joint and urge the rollers 134 into the channel 136. This is illustrated in FIG. 10 where the probe is in coupled relationship with the drogue. The probe has been extended into the drogue by the plane being refueled with the valve operator 47 engaging the conical face 107 of the poppet 105 so that both the poppet and the valve operator are in the open positions. The slanting face 53, as best seen in FIG. 1, at the end of the sleeve 24 has engaged sealing ring 127 within the cylindrical member 111 so that a seal is provided between the latter and the sleeve 24. The sleeve 24 has been retracted within the probe housing 10 against the spring 37. This is made possible when the probe enters the drogue and the three latches 42 are moved inwardly at their rear ends against the springs 43 and are moved radially outwardly of the groove 44 at their forward ends. The drogue and probe are thus assembled and coupled for the flow of fuel through the drogue, into the probe and into the plane being refueled.

As previously indicated, fuel pressure in the line causes the actuators to move the rollers 124 into the channel 126 and a latching force is applied to latch the probe and drogue together with a desired breaking resistance, dependent upon the fuel pressure and conveniently variable by adjustment of the hydraulic actuators.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. We do not wish to be restricted to the specific form shown or uses mentioned except as defined in the accompanying claims, wherein various portions have been separated for clarity of reading and not for emphasis.

We claim:
1. In a probe adapted to cooperate with a drogue in an in-flight aircraft refueling system at extreme temperatures,
   (a) a probe housing;
   (b) a cylindrical retractible sleeve slidably engaged in a cylindrical opening in said housing and having a valve seat formed at its outer end;
   (c) a valve secured to said housing on a stem extending through said sleeve, said sleeve being adapted to cooperate with said valve;
   (d) means normally urging the sleeve in a direction to cause it to seat with the valve;
   (e) the sleeve being adapted to be retracted on the probe housing upon engagement with a drogue so as to open the valve;
   the improvement comprising:
   (f) elastomeric split-ring bearing means between said sleeve and said housing in slidable engagement with said sleeve;
   (g) a predetermined thermal expansion gap between the ends of said split-ring,
   (h) said split-ring being T-shaped in cross section, the T having a relatively long bar extending axially and a relatively short leg extending radially,
   (i) said T-leg extending into an annular groove in said housing to lock said split-ring axially in place, there being clearance for thermal expansion of said leg radially outwardly in said last groove.

2. In a probe adapted to cooperate with a drogue in an in-flight aircraft refueling system at extreme temperatures,
   (a) a probe housing;
   (b) a cylindrical retractible sleeve slidably engaged in a cylindrical opening in said housing and having a valve seat formed at its outer end;
   (c) a valve secured to said housing on a stem extending through said sleeve, said sleeve being adapted to cooperate with said valve;
   (d) means normally urging the sleeve in a direction to cause it to seat with the valve;
   (e) the sleeve being adapted to be retracted on the probe housing upon engagement with a drogue so as to open the valve;
   the improvement comprising:
   (f) elastomeric split-ring bearing means between said sleeve and said housing in slidable engagement with said sleeve;
   (g) a predetermined thermal expansion gap between the ends of said split-ring,
   (h) said split-ring being T-shaped in cross section, the T having a relatively long bar extending axially and a relatively short leg extending radially,
   (i) said T-leg extending into an annular groove in said housing to lock said split-ring axially in place, there being clearance for thermal expansion of said leg radially outwardly in said last groove;
   (j) a seal including an elastomeric continuous ring having an L-shaped cross section, the L-leg extending radially in an annular groove in said housing and surrounding said sleeve adjacent its inner end, the L-base extending axially on the sleeve,
   (k) said continuous ring having a plurality of annular grooves in its base facing said sleeve and having lands between said grooves in snug sealing and slidable contact with said sleeve,
   (l) said seal including an elastomeric O-ring in said last groove in said housing in a compression relationship with an axially directed surface of said last groove and the outer axial surface of said L-base to apply a relatively high unit sealing load on the lands directly radially inwardly of the O-ring;

(m) and a split elastomeric ring having an L-shaped cross section and having a predetermined thermal expansion gap between its ends, (n) the L-base of said last ring being in slidable contact with said sleeve and its L-leg extending radially in said last groove, (o) said O-ring being axially between the L-leg of said seal ring and the L-leg of said last split ring.

3. In a probe adapted to cooperate with a drogue in an in-flight aircraft refueling system at extreme temperatures, (a) a probe housing;

(b) a cylindrical retractible sleeve slidably engaged in a cylindrical opening in said housing and having a valve seat formed at its outer end;

(c) a valve secured to said housing on a stem extending through said sleeve, said sleeve being adapted to cooperate with said valve;

(d) means for supporting said sleeve on said stem;

(e) means normally urging the sleeve in a direction to cause it to seat with the valve;

(f) the sleeve being adapted to be retracted on the probe housing upon engagement with a drogue so as to open the valve;

the improvement comprising:

(g) elastomeric split-ring bearing means between said sleeve and said housing in slidable engagement with said sleeve;

(h) a predetermined thermal expansion gap between the ends of said split-ring, (i) said split-ring being T-shaped in cross section, the T having a relatively long bar extending axially and a relatively short leg extending radially, (j) said T-leg extending into an annular groove in said housing to lock said split-ring axially in place, there being clearance for thermal expansion of said leg radially outwardly in said last groove;

(k) a seal including an elastomeric continuous ring having an L-shaped cross section, the L-leg extending radially in an annular groove in said housing and surrounding said sleeve adjacent its inner end, the L-base extending axially on the sleeve, (l) said continuous ring having a plurality of annular grooves in its base facing said sleeve and having lands between said grooves in snug sealing and slidable contact with said sleeve, (m) said seal including an elastomeric O-ring in said last groove in said housing in a compression relationship with an axially directed surface of said last groove and the outer axial surface of said L-base to apply a relatively high unit sealing load on the lands directly radially inwardly of the O-ring;

(n) a split elastomeric ring having an L-shaped cross section and having a predetermined thermal expansion gap between its ends, (o) the L-base of said last ring being in slidable contact with said sleeve and its L-leg extending radially in said last groove, (p) said O-ring being axially between the L-leg of said seal ring and the L-leg of said last split ring;

(q) and an elastomeric split-ring bearing between said means supporting said sleeve and said stem;

(r) a predetermined thermal expansion gap between the ends of said last split-ring, (s) said last split-ring being T-shaped in cross section, the T having a relatively long bar extending axially and a relatively short leg extending radially, (t) said last T-leg extending into an annular groove surrounding said stem in said sleeve support means to lock said last split-ring axially in place, there being clearance for thermal expansion of said leg radially outwardly in said last groove.

4. A bearing for use at extreme temperatures between two axially slidable telescoped cylindrical members, comprising:

(a) a split-ring of polytetrafluoroethylene, (b) said ring having an inner circumferential surface being continuous in the axial direction;

(c) a central portion of said ring having an enlarged outer diameter, (d) axial end portions of said ring being spaced by said central portion and having smaller outer diameters than said central portion, (e) the cross sectional thickness of said end portions being less than half the cross sectional thickness of said central portion.

5. In combination two telescoped cylindrical members for use at extreme temperatures, (a) an outer member having a cylindrical opening;

(b) an inner cylindrical member slidably engaged with said outer member;

the improvement comprising:

(c) a polytetrafluoroethylene split-ring between said members and being in slidable engagement with one of the members, (d) a pre-determined thermal expansion gap between the ends of said split-ring;

(e) the other of said members having an annular groove in radial alignment with said ring, (f) said ring having a circumferential surface having a continuous diameter for the axial length of the ring and in slidable contact with said one member, (g) said ring having a thickened cross sectional central portion opposite said last surface and extending in said groove to lock said ring axially in place, there being clearance for thermal expansion of the thickened portion within said groove, (h) said ring having axial end portions being spaced by said thickened portion, the cross sectional thickness of said end portions being less than half of the cross sectional thickness of said thickened central portion.

6. In a probe adapted to cooperate with a drogue in an in-flight aircraft refueling system at extreme temperatures, (a) a probe housing;

(b) a cylindrical retractible sleeve having a hard anodized surface slidably engaged in a hard anodized cylindrical surface opening in said housing and having a valve seat formed at its outer end;

(c) a valve secured to said housing on a stem extending through said sleeve, said sleeve being adapted to cooperate with said valve;

(d) means normally urging the sleeve in a direction to cause it to seat with the valve;

(e) the sleeve being adapted to be retracted on the probe housing upon engagement with a drogue so as to open the valve;

the improvement comprising:

(f) a polytetrafluoroethylene split-ring bearing means between said sleeve and said housing in slidable engagement with said sleeve;

(g) a predetermined thermal expansion gap between the ends of said split-ring, (h) said split-ring being T-shaped in cross section, the T having a relatively long bar extending axially and a relatively short leg extending radially, (i) said T-leg extending in an annular groove in said housing to lock said split-ring axially in place, there being clearance for thermal expansion of said leg radially outwardly in said last groove.

7. In a probe adapted to cooperate with a drogue in an in-flight aircraft refueling system at extreme temperatures, (a) a probe housing;

(b) a cylindrical retractible sleeve having a hard anodized surface slidably engaged in a hard anodized cylindrical surface opening in said housing and having a valve seat formed at its outer end;
(c) a valve secured to said housing on a stem extending through said sleeve, said sleeve being adapted to cooperate with said valve;
(d) means normally urging the sleeve in a direction to cause it to seat with the valve;
(e) the sleeve being adapted to be retracted on the probe housing upon engagement with a drogue so as to open the valve;

the improvement comprising:
(f) a polytetrafuoroethylene split-ring bearing means between said sleeve and said housing in slidable engagement with said sleeve;
(g) a predetermined thermal expansion gap between the ends of said split-ring,
(h) said split-ring being T-shaped in cross section, the T having a relatively long bar extending axially and a relatively short leg extending radially,
(i) said T-leg extending in an annular groove in said housing to lock said split-ring axially in place, there being clearance for thermal expansion of said leg radially outwardly in said last groove;
(j) and a seal including a polytetrafluoroethylene continuous ring having an L-shaped cross section, the L-leg extending radially in an annular groove in said housing and surrounding said sleeve adjacent its inner end, the L-base extending axially on the sleeve, (k) said continuous ring having a plurality of annular grooves in its base facing said sleeve and having lands between said grooves in snug sealing and slidable contact with said sleeve,
(l) said seal including a silicone rubber O-ring in said last groove in said housing in a compression relationship with an axially directed surface of said last groove and the outer axial surface of said L-base to apply a relatively high unit sealing load on the lands directly radially inwardly of the O-ring.

References Cited

UNITED STATES PATENTS

| | | | |
|---|---|---|---|
| 2,935,365 | 5/1960 | Dega | 277—165 |
| 3,069,178 | 12/1962 | Rosen | 308—3.5 X |
| 3,092,427 | 6/1963 | Sadler et al. | 92—240 X |
| 3,113,806 | 12/1963 | Cripe | 308—3.5 |
| 3,218,087 | 11/1965 | Hallesy | 277—165 X |

FOREIGN PATENTS

| | | |
|---|---|---|
| 643,873 | 7/1962 | Canada. |
| 1,385,436 | 12/1964 | France. |

LAVERNE D. GEIGER, *Primary Examiner.*

H. S. BELL, *Assistant Examiner.*